US007710897B2

(12) United States Patent
Galou et al.

(10) Patent No.: US 7,710,897 B2
(45) Date of Patent: May 4, 2010

(54) AUTOMATIC DISCOVERY OF LOGICAL NETWORK ELEMENTS FROM EXISTING LINKS IN A NETWORK

(75) Inventors: Salim Galou, San Jose, CA (US); Amitava Bhattacharyya, San Jose, CA (US); An-chung Man, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 1621 days.

(21) Appl. No.: 10/926,008

(22) Filed: Aug. 26, 2004

(65) Prior Publication Data

US 2006/0045027 A1    Mar. 2, 2006

(51) Int. Cl.
*H04L 12/24* (2006.01)
(52) U.S. Cl. .................. 370/254; 370/255; 370/256; 370/257; 369/47.28
(58) Field of Classification Search .......... 370/254, 370/255, 256, 257; 369/47.28
See application file for complete search history.

(56) References Cited

U.S. PATENT DOCUMENTS

| 5,049,873 | A | * | 9/1991 | Robins et al. | ......... | 340/825.01 |
|---|---|---|---|---|---|---|
| 5,537,098 | A | * | 7/1996 | Patrick et al. | ........... | 370/452 |
| 6,411,997 | B1 | * | 6/2002 | Dawes et al. | ........... | 709/224 |
| 6,650,347 | B1 | * | 11/2003 | Nulu et al. | ........... | 715/853 |
| 6,728,205 | B1 | * | 4/2004 | Finn et al. | ........... | 370/217 |
| 6,728,670 | B2 | * | 4/2004 | Schenkel et al. | ........... | 704/224 |
| 6,928,475 | B2 | * | 8/2005 | Schenkel et al. | ........... | 709/224 |
| 7,181,534 | B2 | * | 2/2007 | Semaan et al. | ........... | 709/245 |
| 2002/0112077 | A1 | * | 8/2002 | Semaan et al. | ........... | 709/245 |
| 2005/0108385 | A1 | * | 5/2005 | Wechter et al. | ........... | 709/224 |

* cited by examiner

*Primary Examiner*—Daniel J Ryman
*Assistant Examiner*—Jay P Patel
(74) *Attorney, Agent, or Firm*—Hanify & King, P.C.

(57) ABSTRACT

A method and system for automated discovery of logical network elements in a communications network speeds up and reduces the cost of discovering network elements and mapping network topology of network inter-connections. The method comprises the steps of building a cache of protection mechanisms in the communications network, building a network graph based on physical links of the communications network, traversing the network graph, comprising the step of, at each vertex of the network graph, determining whether there is a deterministic path that leads to a next vertex of the network graph, performing a depth first search on the network graph to determine connected components of the network graph, and creating the logical network elements based on the connected components of the network graph.

30 Claims, 8 Drawing Sheets

100

US 7,710,897 B2

AUTOMATIC DISCOVERY OF LOGICAL NETWORK ELEMENTS FROM EXISTING LINKS IN A NETWORK

BACKGROUND OF THE INVENTION

1. Field of the Invention

The present invention relates to a system and method for automatically discovering network elements and mapping network topology of network inter-connections.

2. Description of the Related Art

As telecommunications services have proliferated, telecommunications networks have become increasingly complex. Today, telecommunications networks, using technologies such as Synchronous Optical Network (SONET), Dense Wavelength Division Multiplexing (DWDM), Asynchronous Transfer Mode (ATM), Ethernet, etc., may extend worldwide and may include thousands of network elements (NEs). One important aspect of managing such a network is the discovery of NEs (as they are added or removed from the network) and the mapping of the network topology (as inter-connections among NEs are added, removed, or changed).

Conventionally, the discovery of NEs and the mapping of the network topology is done manually, with operators having to determine and enter the identity of network elements and the topology of the network inter-connections. This is an expensive and time-consuming process. In a large network, which may include thousands of network elements, this manual process may take days to complete. A need arises for a technique by which network elements may be discovered and network topology mapped that is faster and less expensive than prior art techniques.

Among network topology configurations that are common are elements such as rings and chains. These elements are made up of defined linking patterns among network elements. Conventionally, network users manually defined rings and chains to provide paths through the network. This manual creation is an expensive and time-consuming process, especially in a large network, which may include thousands of network elements. In addition, these rings and chain definitions were not stored in a way that made them useful for network management. A need arises for a technique by which network elements, such as rings and chains, may be defined that is faster and less expensive than prior art techniques and that makes them useful for network management.

SUMMARY OF THE INVENTION

The present invention speeds up and reduces the cost of discovering network elements and mapping network topology of network inter-connections. In one embodiment of the present invention, a method of automated discovery of logical network elements in a communications network, the method comprises the steps of building a cache of protection mechanisms in the communications network, building a network graph based on physical links of the communications network, traversing the network graph, comprising the step of, at each vertex of the network graph, determining whether there is a deterministic path that leads to a next vertex of the network graph, performing a depth first search on the network graph to determine connected components of the network graph, and creating the logical network elements based on the connected components of the network graph.

In one aspect of the present invention, the communications network comprises a SONET or SDH network. The rates of physical links of the logical network element include OC3, OC12, OC48, OC192, OCN, STM1, STM10, STM4, STM16, STM64, EC-1, STM-1, and STM1E. The protection mechanisms of the logical network element include 1+1, APS, MSP, UPSR, SNCP, OUPSR, OSPPR, 2FBLSR, 2FMSPRING, 4FBLSR, and 4FMSPRING.

In one aspect of the present invention, the step of building a network graph based on physical links of the communications network comprises the steps of retrieving the physical links from a network topology database and building a network graph based on the retrieved physical links. The step of traversing the network graph further comprises the steps of terminating an edge of the graph at the vertex, if no deterministic path that leads to the next vertex of the network graph is found and continuing the traverse with the next vertex, if a deterministic path that leads to the next vertex of the network graph is found. The step of creating the logical network elements based on the connected components of the network graph comprises the step of storing a connected component as a ring if the connected component is cyclic, otherwise, storing the connected component as a chain or open ring based on a protection type of the connected component. The method further comprises the step of deleting created logical network elements that include an inactive network element as a member. The method further comprises the step of creating a multisection chain from each single chain that passes through a high speed group of lightwave multiplexer network elements.

BRIEF DESCRIPTION OF THE DRAWINGS

The preferred embodiments of the present invention will be described with reference to the accompanying drawings.

DETAILED DESCRIPTION OF THE PREFERRED EMBODIMENTS

The present invention is a system and method for automatically discovering network elements (NEs) and mapping network topology of network inter-connections. There are a number of arrangements of NEs that are commonly found in real-world networks. These common arrangements include topological structures such as rings, chains, open rings, and others. The term Logical Network Element (LNE) generically describes all of these common arrangements. In particular, a Logical Network Element (LNE) is an aggregation of NEs that form a logical association through which it is possible for to provide a path. An NE may belong to multiple LNEs. Included among LNEs are:

Ring: A Ring is a closed loop system where the first and last vertex of the graph are adjacent. A SONET ring is generally of one of three types: a Unidirectional Path Switched Ring (UPSR), Bidirectional Line Switched Ring (BLSR) or a four-fiber BLSR. A four-fiber BLSR actually has two rings as part of a composite ring.

Open Ring: An Open Ring is an open loop graph where the first vertex and last vertex are not adjacent. But the protection of the system is as such it can support a closed loop ring (UPSR, BLSR).

Subtended Ring: A subtended ring is a ring that extends itself through one or more SONET Nodes.

Interconnected Rings: Ring interconnection can be achieved through many means. One possible mean is through Traditional Dual Ring interconnect with 1+1 protection between the rings. Another means is through subtended rings to provide for (UPSR/UPSR, UPSR/BLSR, BLSR/BLSR) ring interconnection through one single node.

Linear Chain: A chain or linear SONET architecture is configured point-to-point. Traffic moving from point A to point B has only one route to follow.

Physical Link: A physical link is a counterpart of a physical fiber between two facilities on two different NEs.

To achieve an automatic creation of connections through simple domains such as Rings, Chains, Singletons, etc., it is necessary to have an abstraction of these objects. The rationale for this is that many customers have circuits that span a very small number of rings (3 or so). Usually, this is an access ring, an interoffice ring and then another access ring. The rings typically may be interconnected by EC1, OC3 or OC12 interfaces in either 1+1 or dually to provide for maximum protection using Dual Ring Interconnect.

In wider deployments, Single Node Interconnected Rings as well as Dual Node Interconnected Rings will start to appear. The definitions of these terms is explained later in the document.

Figure 1:
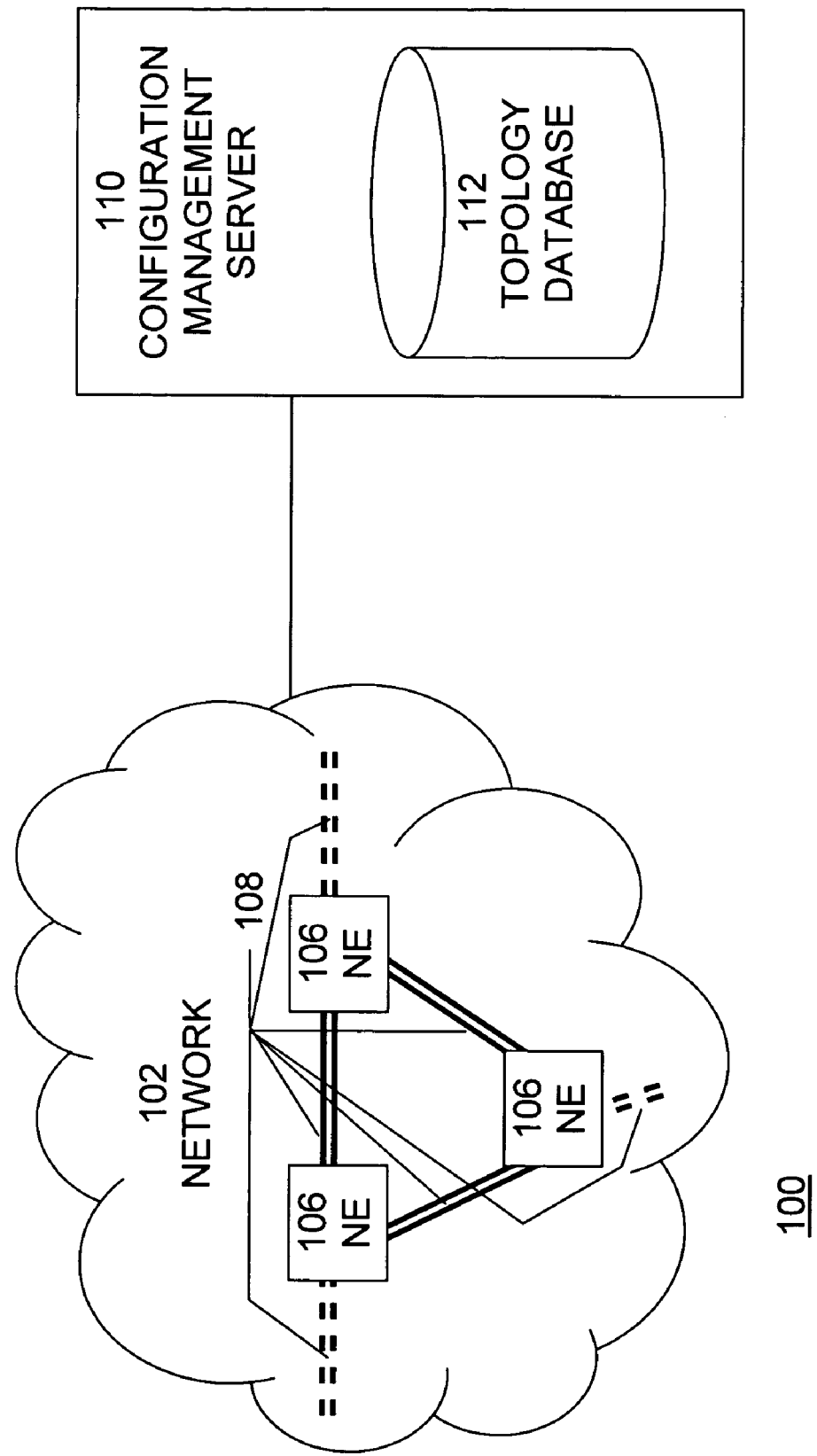
FIG. 1 is an exemplary block diagram of a system in which the present invention may be implemented.

An example of a system 100, in which the present invention may be implemented, is shown in FIG. 1. System 100 includes network 102 and configuration management server 104. Network 102 includes a number of NEs 106 connected by physical links 108 that provide communicative connectivity and carry traffic between NEs. The NEs 106 and their connections 108 form a topological structure that must be managed in order to provide efficient communications and to handle events, such as NE or link outages, that require re-routing of traffic. Configuration management server (CM) 110 provides network management services, such as handling NE faults and alarms, managing network topology, and routing and re-routing network traffic. In particular, CM 110 includes or is connected to topology database 112, which store information relating to the network topology, including NEs 106 included in network 102, links 108 connecting NEs 106, and LNEs that have been defined or discovered within network 102.

Figure 2:
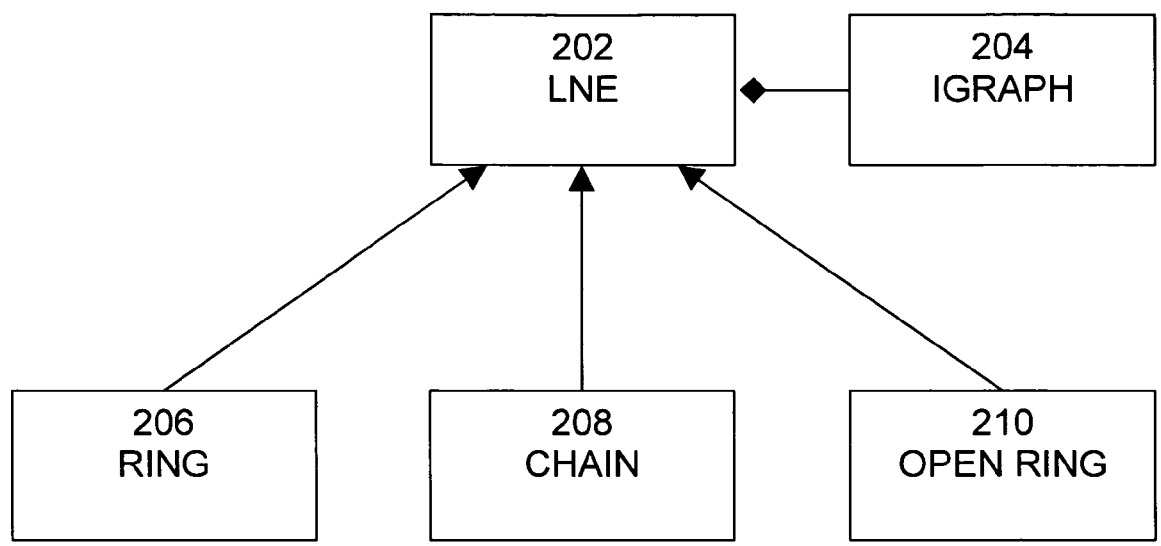
FIG. 2 is an exemplary block diagram of an object model incorporating the basic representation of an LNE.
Figure 3:
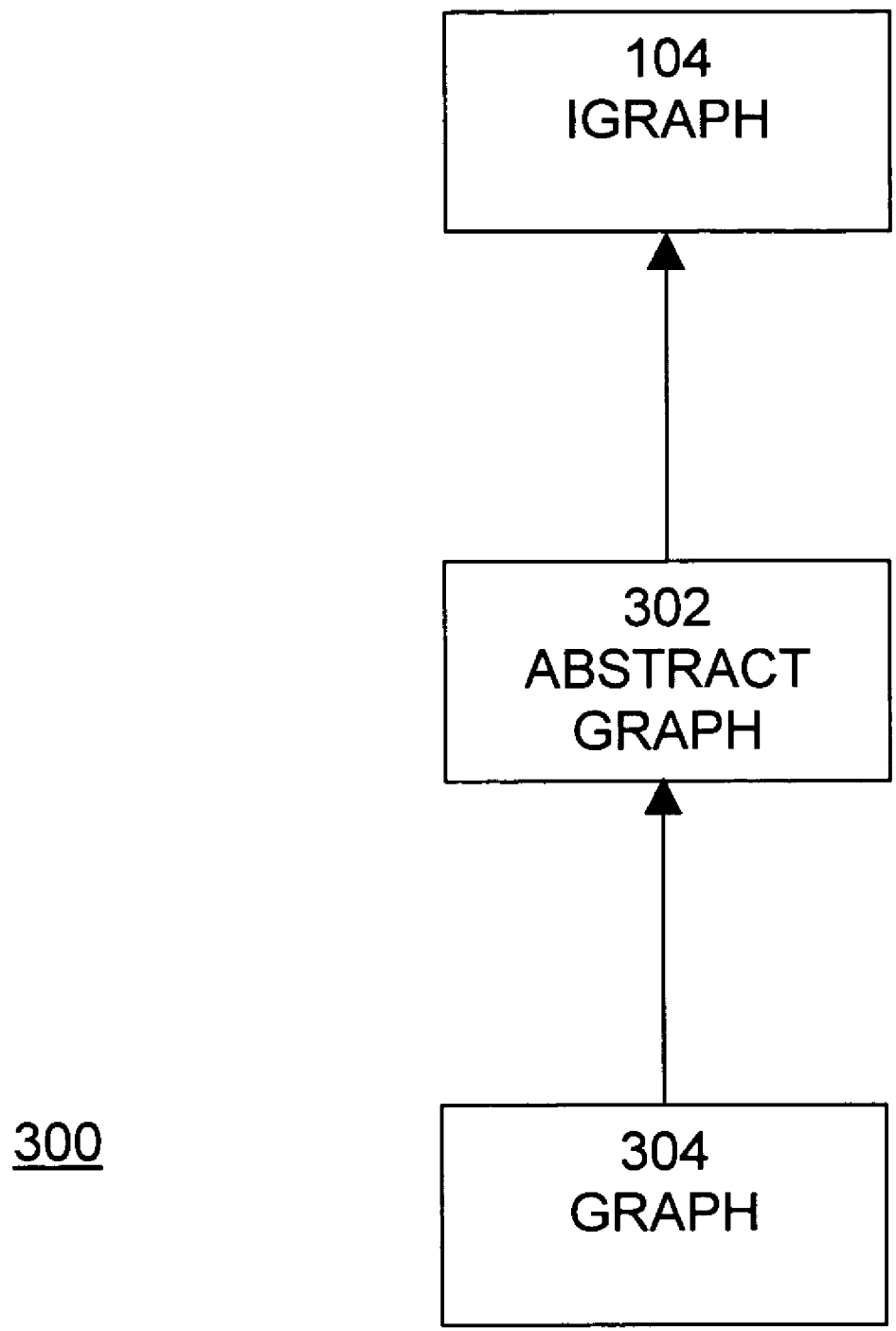
FIG. 3 is an exemplary block diagram of a Graph object model.
Figure 4:
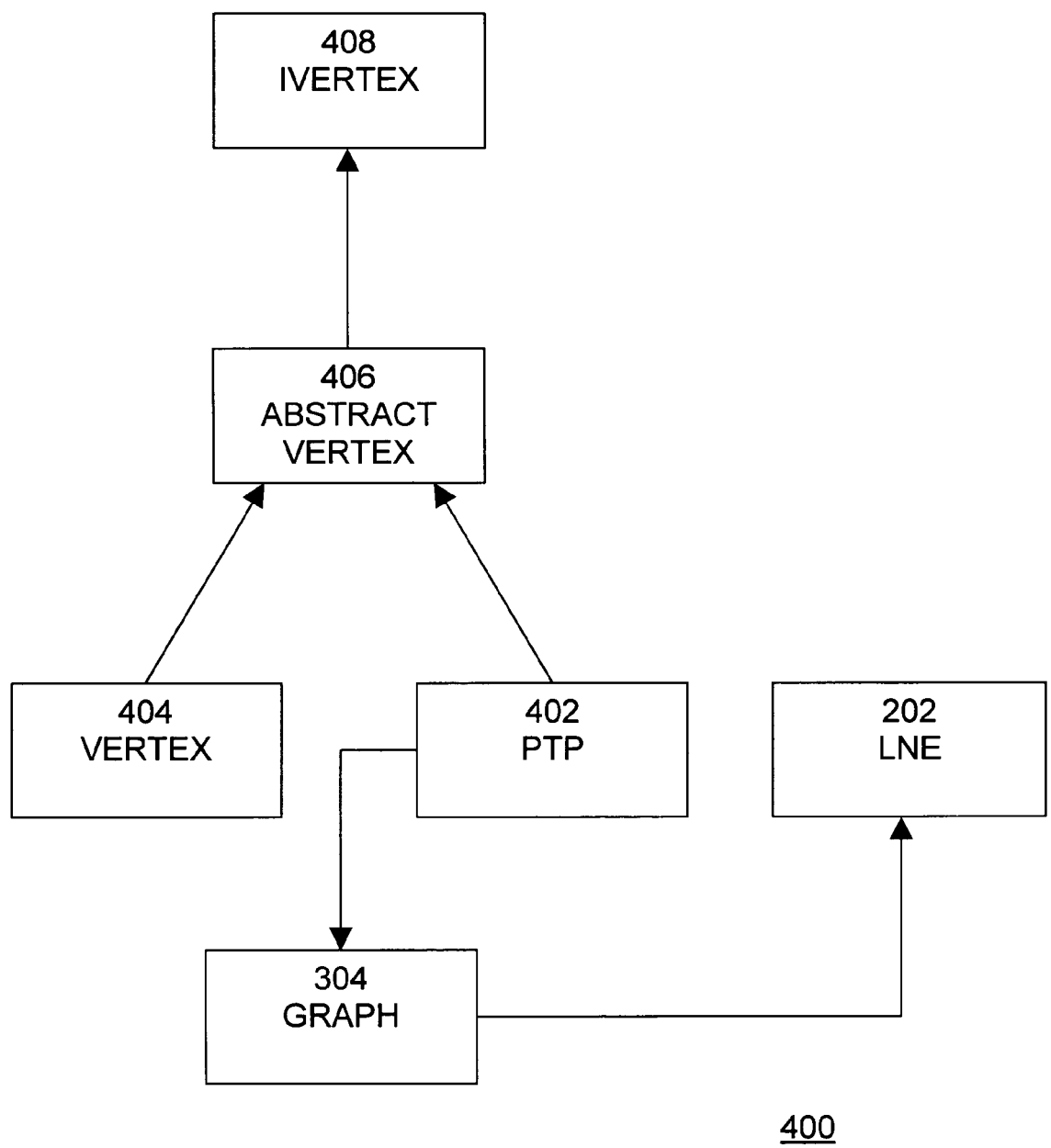
FIG. 4 is an exemplary block diagram showing the correlation among a PTP, a Graph, and an LNE.

Examples of the objects involved in LNE definition and discovery are shown in FIGS. 2-4. FIG. 2 illustrates an example of an object model 200 incorporating the basic representation of an LNE. As shown in FIG. 2, LNE object model 200 includes LNE 202, IGraph 204, and one or more of ring 206, chain 208, and open ring 210. Each of these objects includes particular information and has particular interfaces with other objects. The information and interfaces depend upon the type and structure of the object. For example, an LNE may contain information relating to the data rate(s) supported by the LNE, the type (Ring, Open Ring, Chain, etc.) of the LNE, the state of the LNE and the protection mechanism or Facility Protection Group (FFP) (UPSR, TWOFBLSR, FOURFBLSR, ONEPLUSONE, NOFFP) of the LNE. The interfaces supported on the LNE may include returning the state of the LNE, which indicates whether the LNE is in-sync or out-of-sync with the topology/CM, returning the rate of the LNE, returning the type of the LNE returning the protection mechanism of the LNE, indicating whether a point-to-point path (PTP) is a part of the LNE or not, indicating whether a PTP is a part of the LNE or not, containsTID(String tid) tells if a TID is a part of the LNE or not, returning the number of PTPs involved in the LNE, returning number of TIDs involved in the LNE, indicating whether two LNEs are the same, returning the shorter distance between two LNE nodes, defined as the number of intermediate NE nodes, and returning either SONET/SDH/MIXED depending upon the technology mode the signal is going to pass through.

Ring 206 extends from LNE 202 and may include interfaces such as returning ring paths and ring path directions and indicating in which rings particular network elements are included.

Ring 208 extends from LNE 202 and may include interfaces such as returning chain paths and indicating in which chain particular network elements are included.

IGraph 204 interfaces LNE 202 with the Graph object shown in FIG. 3. FIG. 3 is an example of a Graph object model 300, which includes IGraph 204, abstract Graph 302, and Graph 304. Graph 304 defines an object that is associated with the LNE. Abstract Graph 302 performs the Graph algorithms on the Graph 304 to analyze and categorize the components, such as rings, chains, etc. IGraph 204 then builds the components that are connected to the LNE.

Each connected component is then individually analyzed and the following criteria may used to distinguish the different types of LNEs.

If the first Vertex and last Vertex of the connected component are adjacent then it is a Ring component.

If the first Vertex and last Vertex of the connected component are not adjacent then it is either a Chain or Open Ring component. Whether it is an Open Ring or a Chain is based on the protection scheme type of the PTPs that comprise the LNE.

An example of the correlation among a PTP, a Graph, and an LNE is shown in FIG. 4. From FIG. 4 it is seen that every PTP 402 is a vertex 404 that belongs to a graph 304. PTP 402/vertex 404 form abstract vertex 406, which in turn forms Ivertex 408. From FIGS. 2-4, it is seen that:

Every LNE 202 has a graph 304 associated with it.

Every Ring 206, Chain 208, or OpenRing 210 is actually an LNE 202.

It is also assumed that a PTP can belong to only one LNE at a particular time.

Figure 5:
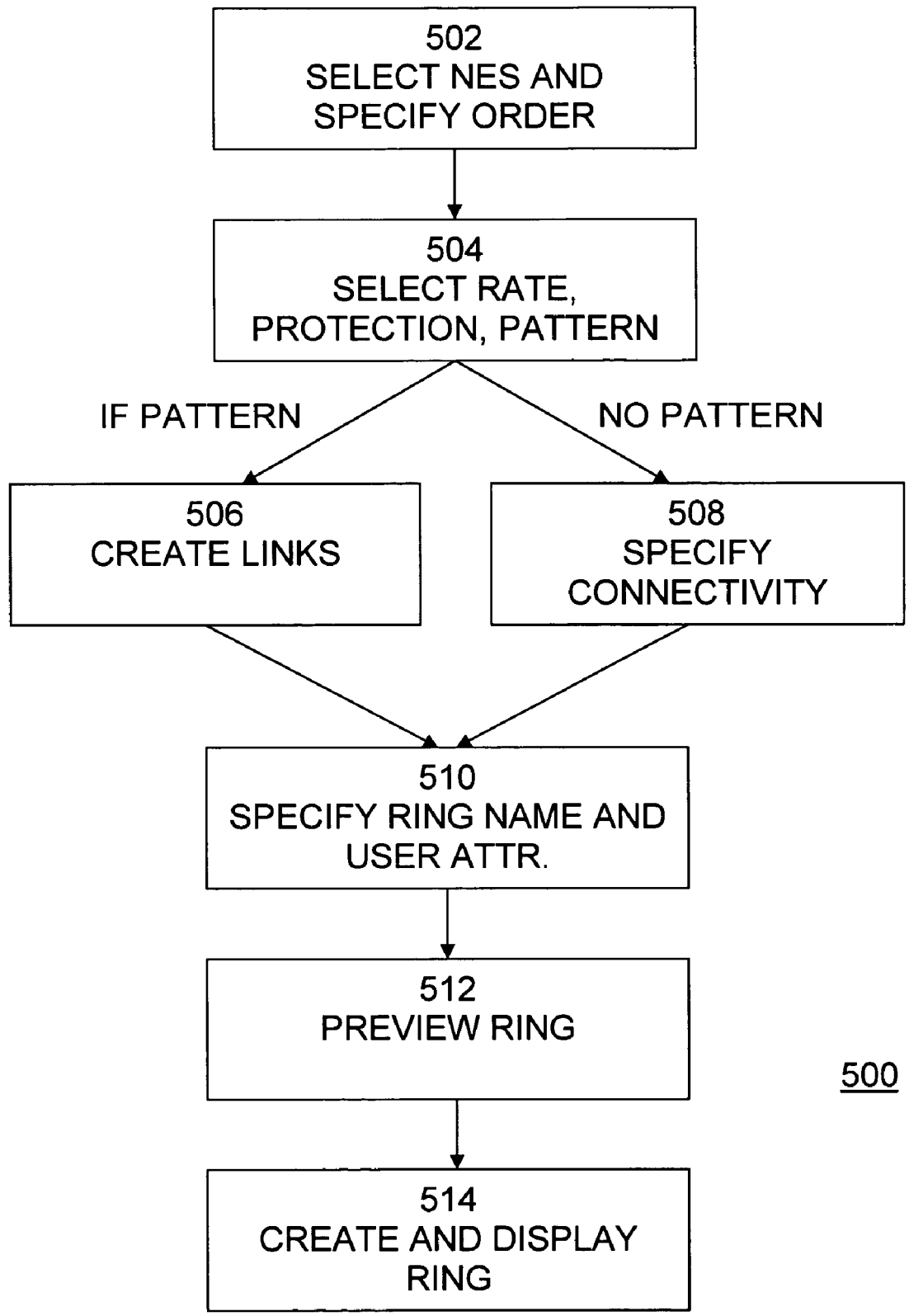
FIG. 5 is an exemplary flow diagram of a process of creating an LNE.

An example of a process 500 for creating an LNE is shown in FIG. 5. This process may be performed manually by a user, in a semi-automated process by use of a wizard or other program, or in an automated process. In the example shown in FIG. 5, a process of creating a ring is shown. Although the process shown in FIG. 5 is an example of the creation of a ring, a similar process is equally applicable to creation of any and all types of LNEs, including, but not limited to chains and open rings.

Process 500 begins with step 502, in which the NEs that will be part of the LNE are specified and the order in which they are to be connected is specified. In step 504, the rate of the LNE, the protection mechanism of the LNE, and the pattern of connection of NEs in the LNE are specified. The rate is selected from among rates supported by the network, such as EC1 or OC12. The protection mechanism is selected from among protection mechanisms supported by the network, such as UPSR. The pattern is selected from among patterns that depend upon the NEs and order of NEs that were specified. These specified patterns provide automated connection of NEs based on the selected pattern. Patterns for automated connection are only provided if a deterministic linking pattern exists for the particular selection of NEs. In other cases, manual connection of NEs must be performed. Manual connection of NEs is also possible in any case, if no pattern is selected.

If a pattern is selected, then in step 506, the links connecting the NEs are automatically generated based on the selected pattern. If no pattern is selected, then in step 508, the physical connectivity between adjacent NEs must be specified. Existing physical links may also be incorporated into the ring to be created, and the other LNE to which this physical link belongs will be updated.

In step 510, the name of the ring and user attributes of the ring are specified. In step 512, the ring to be created is previewed and the connections, attributes, etc. of the ring may be verified. Process 500 may also be re-entered at an earlier step to modify connections, attributes, etc. of the ring if necessary. In step 514, the ring is created and persisted in the topology database as a new LNE. The created ring may also be displayed.

Figure 6:
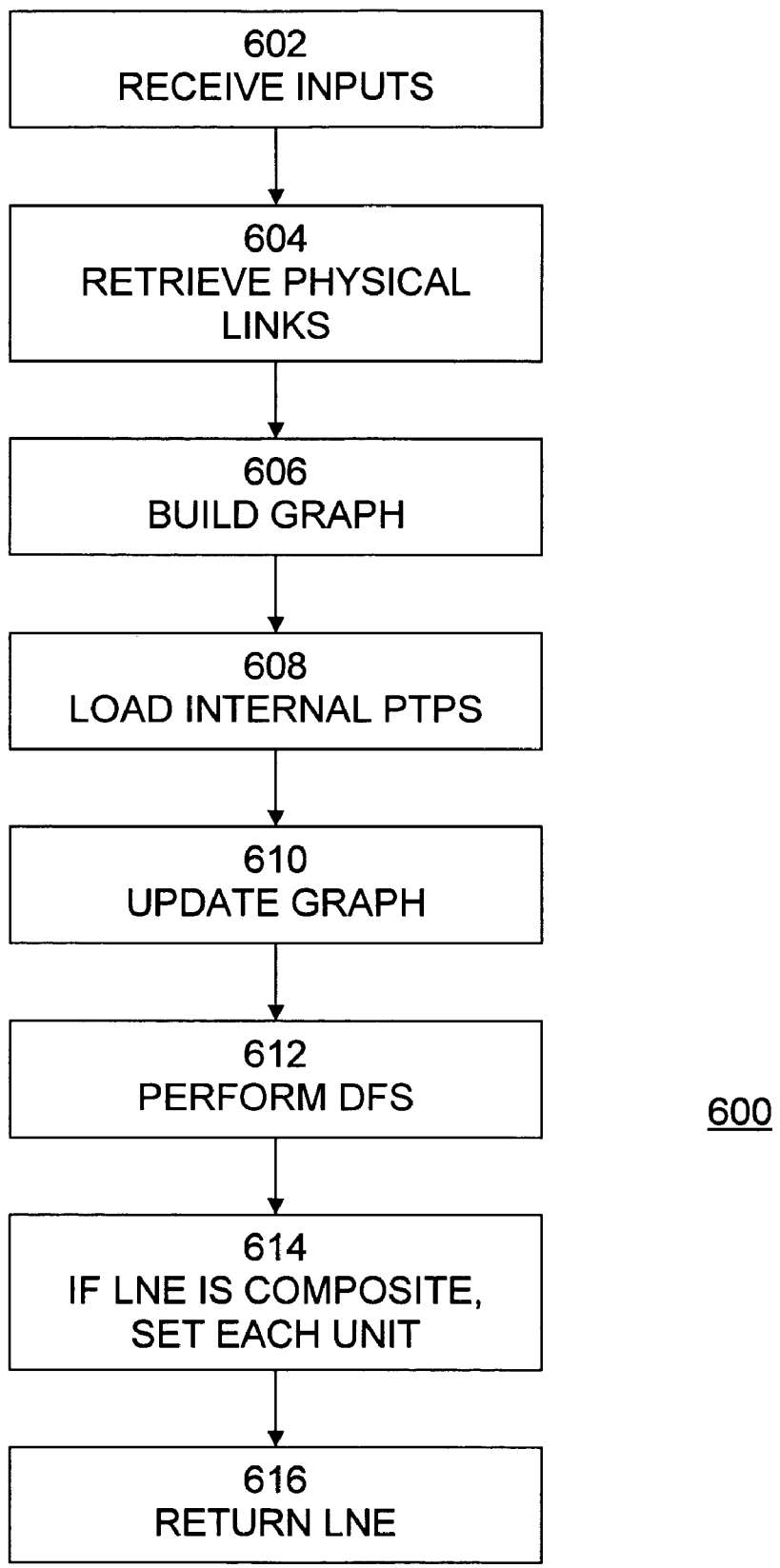
FIG. 6 is an exemplary flow diagram of a process of retrieving a defined LNE from the topology database.

An example of a process 600 of retrieving a defined LNE from the topology database is shown in FIG. 6. Process 600 begins with step 602, in which inputs to the retrieval process are received. Such inputs include criteria upon which to select one or more LNEs for retrieval. These inputs may include information such as a PTP included in the LNE, a user label of the LNE, a TID associated with the LNE, an LNE filter associated with the LNE (filtering parameters such as rate, type, and protection), etc. In step 604, all physical links that satisfy the input criteria are retrieved. In step 606, one or more graphs is built based on the retrieved physical links. Multiple graphs may be needed if the LNE is a composite LNE, that is, an LNE itself including one or more other LNEs. In step 608, the internal PTPs (the PTPs that represent the connectivity of linkable facilities internal to the NE) that satisfy the input criteria are loaded. In step 610, the graph(s) that were built in step 606 are updated based on the internal PTP information. At this point, the graph(s) for the LNE has been created. In step 612, a depth first search (DFS) is performed on the created graph(s) to determine the type of the graph(s). In step 614, if the LNE is a composite LNE, each unit LNE included in the composite LNE is set. In step 616, the completed retrieved LNE is returned from the process.

Once LNEs are created, it is necessary for the user to be able to view them, and retrieve their details, preferably based on context. For example, a context-based view may include the following arrangements:

If the root group of the network is selected all LNEs in the system will be displayed.

If a group other than the root group is selected, then all LNEs whose participating NEs are completely contained within the selected group and its subtree will be displayed.

User can also select the context to be an NE in which case all the LNEs that this NE is a part of are displayed.

If the LNE has a mismatch between its nodecount and the actual number of NEs that are included in that LNE, then the LNE will not be displayed.

Information that may be displayed may include:

Associated Links—All the physical links that participate in the LNE

Associated connections—All the connections that use this LNE for their path.

User Attributes—All the user attributes associated with the LNE

To achieve an automatic creation of Connections through domains such as Rings, Chains, Singletons, etc., it is necessary to have an abstraction of these objects, the LNE. The rationale for this is that many customers have circuits that span a very small number of rings (3 or so). Typically, this is an access ring, an interoffice ring, and then another access ring. The rings may be interconnected by EC1, OC3 or OC12 interfaces in either 1+1 or dually to provide for maximum protection using Dual Ring Interconnect. As networks are deployed more widely, Single Node Interconnected Rings as well as Dual Node Interconnected Rings will start to appear.

In addition, for purposes of LNE discovery, LNEs may have the following attributes:

Name: a string representing the name of the LNE. This is a unique machine generated string for identification purposes.

UserName (or UserLabel): A Name that may be assigned by the user once it is created. Need not be unique.

Type: Ring, Open Ring, or Chain.

Rate: The rate of the LNE, this is a SONET/SDH rate. The rate can be an optical rate (OC3, OC12, OC48, OC192, OCN, or equivalent SDH rates, STM1, STM10, STM4, STM16, STM64) or an electrical rate (EC-1, STM-1 or SDH STM1E).

Protection Mechanism:

1+1 (also known as APS or MSP in SDH),

UPSR (SNCP in SDH),

OUPSR, OSPPR,

2FBLSR (2FMSPRING in SDH),

4FBLSR (4FMSPRING in SDH).

List of NE TIDs that belong to the LNE. The semantic of the order of the list is important and depends on Type.

If Type is Ring, then the list is ordered starting from one arbitrary TID and going around the ring clockwise or counterclockwise until the initial NE is reached again (the initial NE is only listed once).

If Type is Linear, then the list is ordered starting from one of the Terminal NE and going from left to right or right to left until another Terminal NE is reached. A Terminal NE (FFP) is an NE (FFP) that has 2 (1 set of (1+1)) optical or electrical interfaces in 1+1 APS connected to another NE. A Linear NE is an NE that has 4 optical interfaces (2 set of (1+1)). In other words, NEs at the end of the chain are referred to as TERM NEs while NEs in the middle of the chain are referred to a LINEAR NEs.

The list can contain Regenerators (optional): In the case of FLASH 192, and FLASH 2400 it is possible in Rings, OpenRings or Linear systems to have Regenerator NEs.

Links: This is a structure representing the Link information for the LNE. It is OK to assume all bidirectional links for SONET LNEs.

TopologyGraph: A structure representing the topology of the LNE.

The important methods of the LNE are:

create(list of Nodes)
delete( )
addNode(node)
deleteNode(node)
createConnection(ConnectionData)
deleteConnection(connectionName)
getAllConnections(out listOfConnections)
putInMaintenance( )//for In Service Upgrade, puts all nodes in NotAvailable
putOutOfMaintenance( )//InService Upgrade completed
operatePathTrace (PathTraceData)

Figure 7:
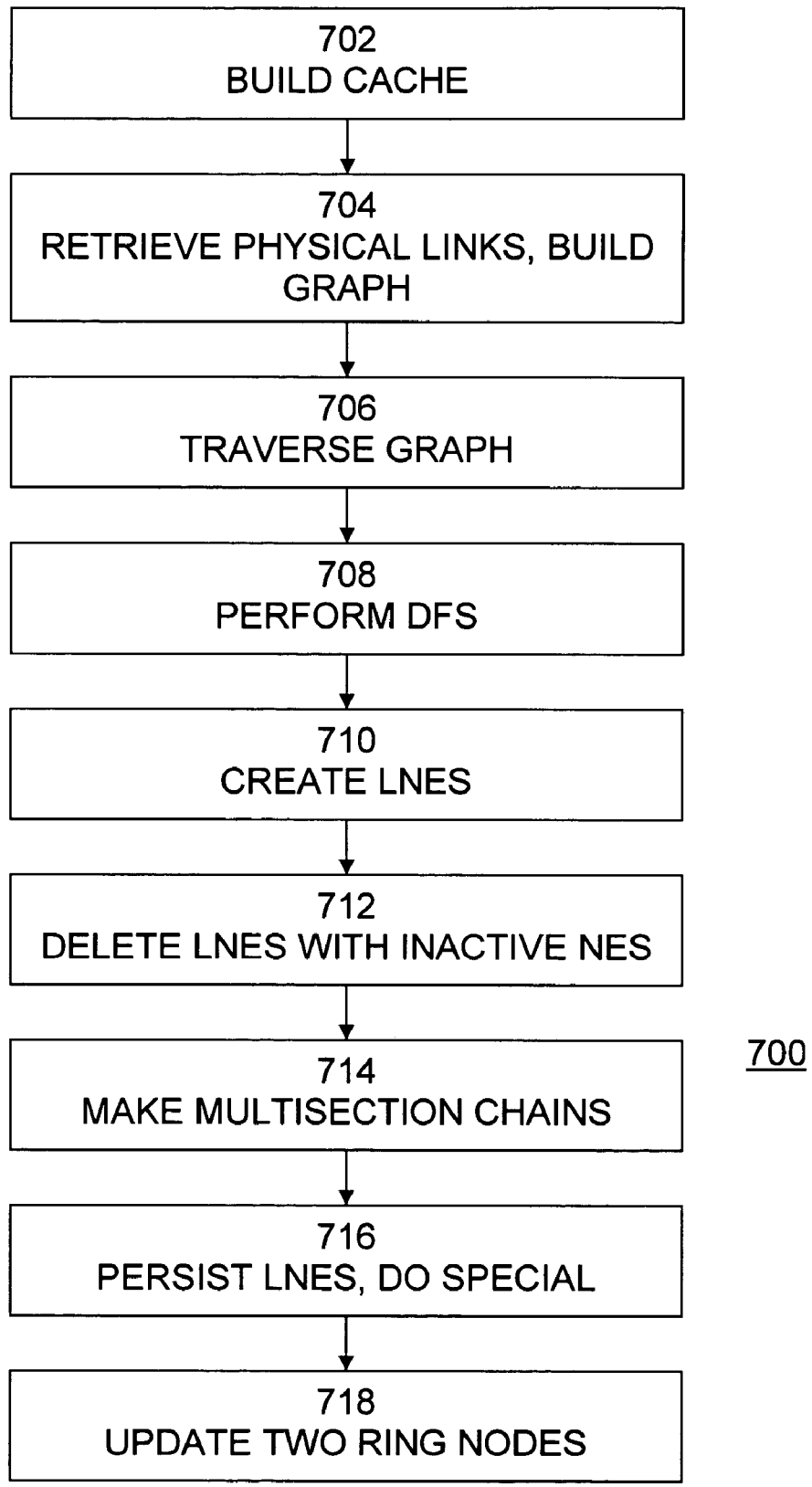
FIG. 7 is an exemplary flow diagram of a process of LNE discovery.

A process 700 of LNE discovery, according to the present invention, is shown in FIG. 7. This process is based on simple graphically-based algorithms. Process 700 begins with step 702, in which a cache of the protection mechanisms in the network, such as 4FBLSR, 1+1 and EC1 high speed FFPs, is built. If the FFPs are not available from CM server then they are fabricated as in the case of REGENS etc.

In step 704, the SONET/SDH Physical links are retrieved from the topology database and a simple network graph is built.

In step 706, the simple network graph is traversed and, at each vertex, it is determined whether there is a deterministic path that leads to the next vertex. This information is found from the FFP object for that Vertex (a PTP in this case). If no deterministic path is found, (which means no FFP exists on that PTP), then the edge terminates at that point. If a deterministic path is found, the traverse is continued with that next vertex. During the building of the graph, if a NE does not respond because it is not auto-discovered, or its CM is not responding, then that NE is put in a special list of inactive NEs and an FFP for that PTP is temporarily fabricated so that the discovery can proceed.

In step 708, once the graph building is complete, a Depth First Search algorithm is run on that graph to determine all the connected components of the graph.

In step 710, the LNEs are built. Each connected component is a potential Ring/Chain or Open Ring. If the connected component is cyclic then it is stored as a Ring, otherwise it is stored as a Chain or Open Ring based on its protection type. For example a UPSR acyclic connected component would be stored as an Open Ring whereas a 0:1 acyclic connected component would be stored as a Chain. There are two unique ids that are assigned to the LNE at this time. One is the LNEID which is the system generated id and the other is the user label which is formed using a predetermined scheme. The user label can be changed later by the user as long as it is unique for that NETSMART instance. The Physical Links that participate in the LNE are updated by the LNEID of the LNE that they belong to. Another table TPIR is also populated at this time with the edges used to traverse inside the NE (initially obtained from FFPs). This is done so that future retrieval of the LNE is faster.

In step 712, once all the unit LNEs have been created the list of Inactive NEs is used to delete all LNEs that have these NEs as a member. This prevents the system from having any partially discovered LNE. User would have to use the Add Ring/Chain wizard to create these LNEs once he has autodiscovered the NEs.

In step 714, all chains passing through high speed groups (Group 1 and Group2) of lightwave multiplexer NEs are made multisection from each chain being a single section. It is a single chain as long as it is passing through high speed groups of lightwave multiplexer NEs. The chain terminates when it reaches a TERMINAL lightwave multiplexer NE.

In step 716, once all the LNEs are persisted then special handling for 1+1, 4FBLSR, EC1 high speed LNEs is done. In the special handling the working and protect LNE in case of 1+1 and 4FBLSR and the three LNEs in case of EC1 high speed are collapsed and the TPLINK and TPIR Inesubid updated with values 1 (WORKING), 2 (PROTECT), 3 (THIRD LNE in case of EC1 high speed LNEs).

In step 718, the last stage of LNE discovery actually updates two node rings to make sure that they show up with angular links in the Topology graphical view.

Figure 8:
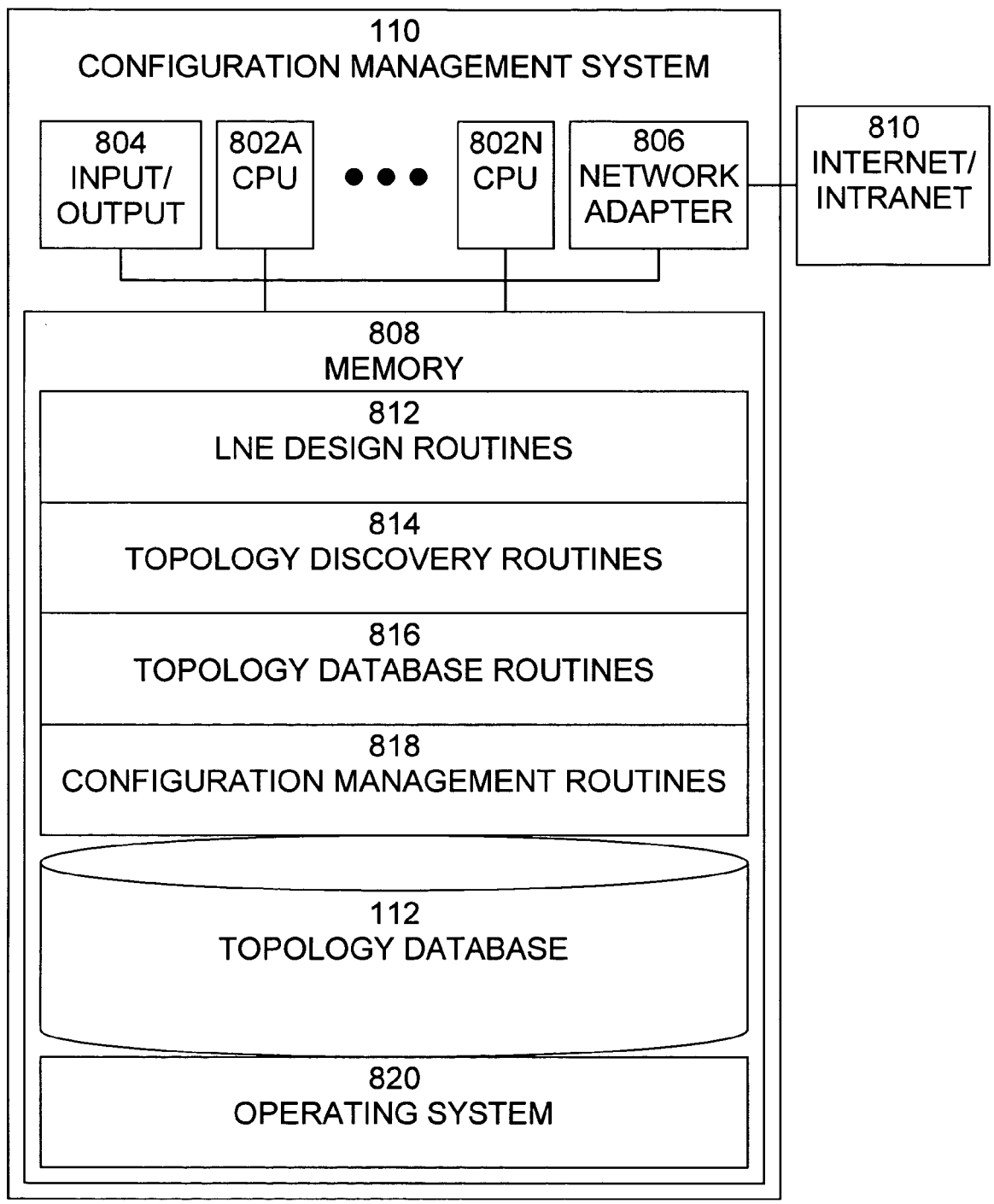
FIG. 8 is an exemplary block diagram of a configuration management system shown in FIG. 1.

An exemplary block diagram of a configuration management system 110, shown in FIG. 1, is shown in FIG. 8. System 800 is typically a programmed general-purpose computer system, such as a personal computer, workstation, server system, and minicomputer or mainframe computer. System 800 includes one or more processors (CPUs) 802A-802N, input/output circuitry 804, network adapter 806, and memory 808. CPUs 802A-802N execute program instructions in order to carry out the functions of the present invention. Typically, CPUs 802A-802N are one or more microprocessors, such as an INTEL PENTIUM® processor. FIG. 8 illustrates an embodiment in which System 800 is implemented as a single multi-processor computer system, in which multiple processors 802A-802N share system resources, such as memory 808, input/output circuitry 804, and network adapter 806. However, the present invention also contemplates embodiments in which System 800 is implemented as a plurality of networked computer systems, which may be single-processor computer systems, multi-processor computer systems, or a mix thereof.

Input/output circuitry 804 provides the capability to input data to, or output data from, database/System 800. For example, input/output circuitry may include input devices, such as keyboards, mice, touchpads, trackballs, scanners, etc., output devices, such as video adapters, monitors, printers, etc., and input/output devices, such as, modems, etc. Network adapter 806 interfaces database/System 800 with Internet/intranet 810. Internet/intranet 810 may include one or more standard local area network (LAN) or wide area network (WAN), such as Ethernet, Token Ring, the Internet, or a private or proprietary LAN/WAN.

Memory 808 stores program instructions that are executed by, and data that are used and processed by, CPU 802 to perform the functions of system 800. Memory 808 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 808 varies depending upon the function that system 800 is programmed to perform. One of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 8, memory 808 includes LNE design routines 812, topology discovery routines 814, topology database routines 816, configuration management routines 818, topology database 112, and operating system 820. LNE design routines 812 include routines for creating LNEs, such as routines implementing process 500, shown in FIG. 5, routines for modifying LNEs, routines for viewing LNEs, etc. Topology discovery routines 814 include routines for discovering network topology, such as routines implementing process 700, shown in FIG. 7, etc. Topology database routines 816 include routines for storing and retrieving topology data from topology database 112, such as routines implementing process 600, shown in FIG. 6. Configuration management routines 818 implement functionality of configuration management system 110, such as providing network management services, such as handling NE faults and alarms, managing network topology, and routing and re-routing network traffic. Topology database 112 stores information relating to the network topology, including NEs included in the network, links connecting NEs, and LNEs that have been defined or discovered within the network. Operating system 820 provides overall system functionality.

As shown in FIG. 8, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of automated discovery of logical network elements in a communications network, the method comprising the steps of:
   building a cache of protection mechanisms in the communications network using a processor operable to execute computer program instructions stored in a memory;
   building a network graph based on physical links of the communications network using the processor;
   traversing the network graph, comprising the step of, at each vertex of the network graph, determining whether there is a deterministic path that leads to a next vertex of the network graph using the processor;
   performing a depth first search on the network graph to determine connected components of the network graph using the processor; and
   creating the logical network elements based on the connected components of the network graph and associated cached protection mechanisms using the processor;
   wherein the communications network comprises a SONET or SDH network; and
   wherein the step of traversing the network graph further comprises the steps of:

terminating an edge of the graph at the vertex, if no deterministic path that leads to the next vertex of the network graph is found; and
   continuing the traverse with the next vertex, if a deterministic path that leads to the next vertex of the network graph is found.

2. A method of automated discovery of logical network elements in a communications network, the method comprising the steps of:
   building a cache of protection mechanisms in the communications network using a processor operable to execute computer program instructions stored in a memory;
   building a network graph based on physical links of the communications network using the processor;
   traversing the network graph, comprising the step of at each vertex of the network graph, determining whether there is a deterministic path that leads to a next vertex of the network graph using the processor;
   performing a depth first search on the network graph to determine connected components of the network graph using the processor; and
   creating the logical network elements based on the connected components of the network graph and associated cached protection mechanisms using the processor;
   wherein the communications network comprises a SONET or SDH network; and
   wherein the step of creating the Logical network elements based on the connected components of the network graph comprises the step of;
   storing a connected component as a ring if the connected component is cyclic, otherwise, storing the connected component as a chain or open ring based on a protection type of the connected component.

3. A method of automated discovery of logical network elements in a communications network, the method comprising the steps of:
   building a cache of protection mechanisms in the communications network using a processor operable to execute computer program instructions stored in a memory;
   building a network graph based on physical links of the communications network using the processor;
   traversing the network graph, comprising the step of, at each vertex of the network graph, determining whether there is a deterministic path that leads to a next vertex of the network graph using the processor;
   performing a depth first search on the network graph to determine connected components of the network graph using the processor;
   creating the logical network elements based on the connected components of the network graph and associated cached protection mechanisms using the processor; and
   deleting created logical network elements that include an inactive network element as a member using the processor;
   wherein the communications network comprises a SONET or SDH network.

4. A method of automated discovery of logical network elements in a communications network, the method comprising the steps of:
   building a cache of protection mechanisms in the communications network using a processor operable to execute computer program instructions stored in a memory;
   building a network graph based on physical links of the communications network using the processor;
   traversing the network graph, comprising the step of, at each vertex of the network graph, determining whether there is a deterministic path that leads to a next vertex of the network graph using the processor;

performing a depth first search on the network graph to determine connected components of the network graph using the processor;

creating the logical network elements based on the connected components of the network graph and associated cached protection mechanisms using the processor; and creating a multisection chain from each single chain that passes through a high speed group of lighwave multiplexer network elements using the processor;

wherein the communications network comprises a SONET or SDH network.

5. A method of automated discovery of logical network elements in a communications network, the method comprising the steps of:

building a cache of protection mechanisms in the communications network using a processor operable to execute computer program instructions stored in a memory;

building a network graph based on physical links of the communications network using the processor;

traversing the network graph, comprising the step of, at each vertex of the network graph, determining whether there is a deterministic path that leads to a next vertex of the network graph using the processor;

performing a depth first search on the network graph to determine connected components of the network graph using the processor; and creating the logical network elements based on the connected components of the network graph and associated cached protection mechanisms using the processor;

wherein the communications network comprises a SONET or SDH network;

wherein the step of building a network graph based on physical links of the communications network comprises the steps of:

retrieving the physical links from a network topology database, and building a network graph based on the retrieved physical links; and wherein the step of traversing the network graph further comprises the steps of:

terminating an edge of the graph at the vertex, if no deterministic path that leads to the next vertex of the network graph is found; and continuing the traverse with the next vertex, if a deterministic path that leads to the next vertex of the network graph is found.

6. The method of claim 5, wherein the step of creating the logical network elements based on the connected components of the network graph comprises the step of:

storing a connected component as a ring if the connected component is cyclic, otherwise, storing the connected component as a chain or open ring based on a protection type of the connected component.

7. The method of claim 6, further comprising the step of deleting created logical network elements that include an inactive network element as a member.

8. The method of claim 7, further comprising the step of: creating a multisection chain from each single chain that passes through a high speed group of lighttwave multiplexer network elements.

9. The method of claim 8, wherein rates of physical links of the logical network element include OC3, OC12, OC48, OC192, OCN, STM1, STM10, STM4, STM16, STM64, EC-1, STM-1, and STM1E.

10. The method of claim 9, wherein protection mechanisms of the logical network element include 1+1, APS, MSP, UPSR, SNCP, OUPSR, OSPPR, 2FBLSR, 2FMSPRING, 4FBLSR, and 4FMSPRING.

11. A system for automated discovery of logical network elements in a communications network, the system comprising:

means for building a cache of protection mechanisms in the communications network;

means for building a network graph based on physical links of the communications network;

means for traversing the network graph, comprising the step of at each vertex of the network graph, determining whether there is a deterministic path that leads to a next vertex of the network graph;

means for performing a depth first search on the network graph to determine connected components of the network graph; and means for creating the logical network elements based on the connected components of the network graph and associated cached protection mechanisms;

wherein the communications network comprises a SONET or SDH network; and wherein the means for traversing the network graph further comprises:

means for terminating an edge of the graph at the vertex, if no deterministic path that leads to the next vertex of the network graph is found; and means for continuing the traverse with the next vertex, if a deterministic path that leads to the next vertex of the network graph is found.

12. A system for automated discovery of logical network elements in a communications network, the system comprising:

means for building a cache of protection mechanisms in the communications network;

means for building a network graph based on physical links of the communications network;

means for traversing the network graph, comprising the step of, at each vertex of the network graph, determining whether there is a deterministic path that leads to a next vertex of the network graph;

means for performing a depth first search on the network graph to determine connected components of the network graph; and means for creating the logical network elements based on the connected components of the network graph and associated cached protection mechanisms;

wherein the communications network comprises a SONET or SDH network; and wherein the means for creating the logical network elements based on the connected components of the network graph comprises;

means for storing a connected component as a ring if the connected component is cyclic, otherwise, storing the connected component as a chain or open ring based on a protection type of the connected component.

13. A system for automated discovery of logical network elements in a communications network, the system comprising:

means for building a cache of protection mechanisms in the communications network;

means for building a network graph based on physical links of the communications network;

means for traversing the network graph, comprising the step of, at each vertex of the network graph, determining whether there is a deterministic path that leads to a next vertex of the network graph;

means for performing a depth first search on the network graph to determine connected components of the network graph;

means for creating the logical network elements based on the connected components of the network graph and associated cached protection mechanisms; and means for deleting created logical network elements that include an inactive network element as a member;

wherein the communications network comprises a SONET or SDH network.

14. A system for automated discovery of logical network elements in a communications network, the system comprising:

means for building a cache of protection mechanisms in the communications network;

means for building a network graph based on physical links of the communications network;

means for traversing the network graph, comprising the step of, at each vertex of the network graph, determining whether there is a deterministic path that leads to a next vertex of the network graph;

means for performing a depth first search on the network graph to determine connected components of the network graph;

means for creating the logical network elements based on the connected components of the network graph and associated cached protection mechanisms; and means for creating a multisection chain from each single chain that passes through a high speed group of lightwave multiplexer network elements;

wherein the communications network comprises a SONET or SDH network.

15. A system for automated discovery of logical network elements in a communications network, the system comprising:

means for building a cache of protection mechanisms in the communications network;

means for building a network graph based on physical links of the communications network;

means for traversing the network graph, comprising the step of, at each vertex of the network graph, determining whether there is a deterministic path that leads to a next vertex of The network graph;

means for performing a depth first search on the network graph to determine connected components of the network graph; and means for creating The logical network elements based on the connected components of the network graph and associated cached protection mechanisms;

wherein the communications network comprises a SONET or SDH network;

wherein the means for building a network graph based on physical links of the communications network comprises:

means for retrieving the physical links from a network topology database, and means for building a network graph based on the retrieved physical links; and wherein the means for traversing the network graph further comprises:

means for terminating an edge of the graph at the vertex, if no deterministic path that leads to the next vertex of the network graph is found; and means for continuing the traverse with the next vertex, if a deterministic path that leads to the next vertex of the network graph is found.

16. The system of claim 15, wherein the means for creating the logical network elements based on the connected components of the network graph comprises:

means for storing a connected component as a ring if the connected component is cyclic, otherwise, storing the connected component as a chain or open ring based on a protection type of the connected component.

17. The system of claim 16, further comprising:

means for deleting created logical network elements that include an inactive network element as a member.

18. The system of claim 17, further comprising:

means for creating a multisection chain from each single chain that passes through a high speed group of lightwave multiplexer network elements.

19. The system of claim 18, wherein rates of physical links of the logical network element include OC3, OC12, OC48, OC192, OCN, STM1, STM10, STM4, STM16, STM64, STM-1, and STM1E.

20. The system of claim 19, wherein protection mechanisms of the logical network element include 1+1, APS, MSP, UPSR, SNCP, OUPSR, OSPPR, 2FBLSR, 2FMSPRING, 4FBLSR, and 4FMSPRING.

21. A system for automated discovery of logical network elements in a communications network comprising:

a processor operable to execute computer program instructions;

a memory operable to store computer program instructions executable by the processor; and computer program instructions stored in the memory and executable to perform the steps of:

building a cache of protection mechanisms in the communications network;

building a network graph based on physical links of the communications network;

traversing the network graph, comprising the step of, at each vertex of the network graph, determining whether there is a deterministic path that leads to a next vertex of the network graph;

performing a depth first search on the network graph to determine connected components of the network graph; and creating the logical network elements based on the connected components of the network graph and associated cached protection mechanisms;

wherein the communications network comprises a SONET or SDH network; and wherein the step of traversing the network graph further comprises the steps of:

terminating an edge of the graph at the vertex, if no deterministic path that leads to the next vertex of the network graph is found; and continuing the traverse with the next vertex, if a deterministic path that leads to the next vertex of the network graph is found.

22. A system for automated discovery of logical network elements in a communications network comprising:

a processor operable to execute computer program instructions;

a memory operable to store computer program instructions executable by the processor; and computer program instructions stored in the memory and executable to perform the steps of:

building a cache of protection mechanisms in the communications network;

building a network graph based on physical links of the communications network;

traversing the network graph, comprising the step of at each vertex of the network graph, determining whether there is a deterministic path that leads to a next vertex of the network graph;

performing a depth first search on the network graph to determine connected components of the network graph; and creating the logical network elements based on the connected components of the network graph and associated cached protection mechanisms;

wherein the communications network comprises a SONET or SDH network; and wherein the step of creating the logical network elements based on the connected components of the network graph comprises the step of:

storing a connected component as a ring if the connected component is cyclic, otherwise, storing the connected component as a chain or open ring based on a protection type of the connected component.

23. A system for automated discovery of logical network elements in a communications network comprising:

a processor operable to execute computer program instructions;

a memory operable to store computer program instructions executable by the processor; and computer program instructions stored in the memory and executable to perform the steps of:

building a cache of protection mechanisms in the communications network;

building a network graph based on physical links of the communications network;

traversing the network graph, comprising the step of, at each vertex of the network graph, determining whether there is a deterministic path that leads to a next vertex of the network graph;

performing a depth first search on the network graph to determine connected components of the network graph;

creating the logical network elements based on the connected components of the network graph and associated cached protection mechanisms; and deleting created logical network elements that include an inactive network element as a member.

24. A system for automated discovery of logical network elements in a communications network comprising:

a processor operable to execute computer program instructions;

a memory operable to store computer program instructions executable by the processor; and computer program instructions stored in the memory and executable to perform the steps of:

building a cache of protection mechanisms in the communications network;

building a network graph based on physical links of the communications network;

traversing the network graph, comprising the step of, at each vertex of the network graph, determining whether there is a deterministic path that leads to a next vertex of the network graph;

performing a dept first search on the network graph to determine connected components of the network graph;

creating the logical network elements based on the connected components of the network graph and associated cached protection mechanisms; and creating a multisection chain from each single chain that passes through a high speed group of lighttwave multiplexer network elements.

25. A system for automated discovery of logical network elements in a communications network comprising:

a processor operable to execute computer program instructions;

a memory operable to store computer program instructions executable by the processor; and computer program instructions stored in the memory and executable to perform the steps of:

building a cache of protection mechanisms in the communications network;

building a network graph based on physical links of the communications network;

traversing the network graph, comprising the step of, at each vertex of the network graph, determining whether there is a deterministic path that leads to a next vertex of the network graph;

performing a depth first search on the network graph to determine connected components of the network graph; and creating the logical network elements based on the connected components of the network graph and associated cached protection mechanisms;

wherein the communications network comprises a SONET or SDH network;

wherein the step of building a network graph based on physical links of the communications network comprises the steps of:

retrieving the physical links from a network topology database, and building a network graph based on the retrieved physical links; and wherein the step of traversing the network graph further comprises the steps of:

terminating an edge of the graph at the vertex, if no deterministic path that leads to the next vertex of the network graph is found; and continuing the traverse with the next vertex, if a deterministic path that leads to the next vertex of the network graph is found.

26. The system of claim 25, wherein the step of creating the logical network elements based on the connected components of the network graph comprises the step of:

storing a connected component as a ring if the connected component is cyclic, otherwise, storing the connected component as a chain or open ring based on a protection type of the connected component.

27. The system of claim 26, further comprising the step of:
deleting created logical network elements that include an inactive network element as a member.

28. The system of claim 27, further comprising the step of:
creating a multisection chain from each single chain that passes through a high speed group of lightwave multiplexer network elements.

29. The system of claim 28, wherein rates of physical links of the logical network element include OC3, OC12, OC48, OC192, OCN, STM1, STM10, STM4, STM16, STM64, EC-1, STM-1, and STM1E.

30. The system of claim 29, wherein protection mechanisms of the logical network element include 1+1, APS, MSP, UPSR, SNCP, OUPSR, OSPPR, 2FBLSR, 2FMSPRING, 4FBLSR, and 4FMSPRING.

* * * * *